(12) United States Patent
Holstein et al.

(10) Patent No.: US 8,952,559 B2
(45) Date of Patent: Feb. 10, 2015

(54) POWER PLANT WITH CASSETTE-TYPE POWER UNIT

(75) Inventors: Benjamin Holstein, Heidenheim (DE); Jorg Lochschmidt, Neu Ulm (DE); Thomas Pontow, Gerstetten (DE)

(73) Assignee: Voith Patent GmbH, Heidenheim, Deutschland ( * ) Notice: Subject to any disclaimer, the term of this patent is extended or adjusted under 35 U.S.C. 154(b) by 17 days.

(21) Appl. No.: 13/638,543

(22) PCT Filed: Apr. 20, 2011

(86) PCT No.: PCT/EP2011/002010
§ 371 (c)(1),
(2), (4) Date: Dec. 20, 2012

(87) PCT Pub. No.: WO2011/134619
PCT Pub. Date: Nov. 3, 2011

(65) Prior Publication Data
US 2013/0088014 A1    Apr. 11, 2013

(30) Foreign Application Priority Data

Apr. 29, 2010    (DE) .......................... 10 2010 018 804

(51) Int. Cl.
*F03B 13/00*    (2006.01)
*F03B 3/12*    (2006.01)
*F03B 3/18*    (2006.01)
(Continued)

(52) U.S. Cl.
CPC ... *F03B 3/12* (2013.01); *F03B 3/18* (2013.01); *F03B 13/083* (2013.01); *F03B 17/061* (2013.01); *F03B 3/121* (2013.01); *F05B 2240/133* (2013.01); *F05B 2240/97* (2013.01); *Y02E 10/22* (2013.01); *Y02E 10/223* (2013.01); *Y02E 10/28* (2013.01)
USPC ............................................... 290/52

(58) Field of Classification Search
CPC ................. F03B 17/06; F03B 17/61
USPC .......................................... 290/54
See application file for complete search history.

(56) References Cited

U.S. PATENT DOCUMENTS

| 1,493,154 A | 5/1924 | Harza |
| 1,504,746 A * | 8/1924 | De Wein .......................... 60/696 |

(Continued)

FOREIGN PATENT DOCUMENTS

| CA | 2352673 A1 | 5/2003 |
| CN | 1858434 A * | 11/2006 |

(Continued)

OTHER PUBLICATIONS

WIPO International Preliminary Examination Report of WO 02/04808 A1. Oct. 22, 2002.*

(Continued)

*Primary Examiner* — Joseph Waks
(74) *Attorney, Agent, or Firm* — Leydig, Voit & Mayer, Ltd.

(57) ABSTRACT

A hydroelectric power station has an energy unit including a turbine and a generator. The impeller of the turbine includes an impeller ring and turbine blades. The radially outer ends of the turbine blades are fixed to the inner surface of the impeller ring, and the radially inner ends of the turbine blades are free and together form a central passage. The impeller ring is surrounded by the generator and acts as a bearing therefor.

20 Claims, 11 Drawing Sheets

(51) Int. Cl.
*F03B 13/08* (2006.01)
*F03B 17/06* (2006.01)

(56) References Cited

U.S. PATENT DOCUMENTS

| | | | | |
|---|---|---|---|---|
| 1,583,415 | A * | 5/1926 | Moody | 60/325 |
| 1,674,610 | A * | 6/1928 | Pfau | 137/1 |
| 2,634,375 | A * | 4/1953 | Guimbal | 290/52 |
| 4,159,188 | A * | 6/1979 | Atencio | 405/78 |
| 4,272,685 | A | 6/1981 | Toyama | |
| 4,289,971 | A * | 9/1981 | Ueda | 290/52 |
| 4,686,376 | A * | 8/1987 | Retz | 290/42 |
| 5,484,266 | A * | 1/1996 | Murga | 417/44.1 |
| 6,114,773 | A * | 9/2000 | Kouris | 290/52 |
| 7,218,011 | B2 * | 5/2007 | Hiel et al. | 290/43 |
| 7,471,009 | B2 | 12/2008 | Davis et al. | |
| 7,605,486 | B2 * | 10/2009 | Bridwell | 290/43 |
| 8,120,197 | B2 * | 2/2012 | Branco | 290/54 |
| 8,294,290 | B2 * | 10/2012 | da Silva | 290/52 |
| 8,310,077 | B2 * | 11/2012 | Pearce | 290/54 |
| 8,506,244 | B2 * | 8/2013 | McBride et al. | 415/204 |
| 8,536,723 | B2 * | 9/2013 | Roos | 290/52 |
| 8,558,402 | B2 * | 10/2013 | Krouse et al. | 290/52 |
| 2003/0223857 | A1 | 12/2003 | Milan et al. | |
| 2004/0013510 | A1 | 1/2004 | Williams | |
| 2005/0005592 | A1 * | 1/2005 | Fielder | 60/200.1 |
| 2007/0216245 | A1 * | 9/2007 | Fielder | 310/102 R |
| 2009/0021011 | A1 * | 1/2009 | Shifrin et al. | 290/43 |
| 2010/0038910 | A1 * | 2/2010 | da Silva | 290/52 |
| 2012/0076648 | A1 * | 3/2012 | McBride et al. | 415/204 |
| 2013/0011251 | A1 * | 1/2013 | Franco de Oliveira Falcao et al. | 415/208.2 |

FOREIGN PATENT DOCUMENTS

| | | | |
|---|---|---|---|
| DE | 747919 | * | 5/1943 |
| DE | 35 42 096 A1 | | 10/1997 |
| FR | 2 669 056 A1 | | 5/1992 |
| GB | 2 447 514 | | 9/2008 |
| GB | 2447514 A | * | 9/2008 |
| GB | 2 447 154 B | | 5/2009 |
| WO | WO 02/04808 A1 | | 1/2002 |
| WO | WO 03/029645 A1 | | 4/2003 |
| WO | WO 2004/113717 A1 | | 12/2004 |
| WO | WO 2007/055585 A1 | | 5/2007 |
| WO | WO 2008006614 A1 | * | 1/2008 |
| WO | WO 2008/081187 A2 | | 7/2008 |
| WO | WO 2008/130940 A1 | | 10/2008 |
| WO | WO 2009/153124 A2 | | 12/2009 |

OTHER PUBLICATIONS

European Patent Office, International Search Report in International Patent Application No. PCT/EP2011/002010 (Jan. 26, 2012).

* cited by examiner

POWER PLANT WITH CASSETTE-TYPE POWER UNIT

CROSS-REFERENCE TO RELATED APPLICATIONS

This patent application is the national phase of PCT/EP2011/002010, filed Apr. 20, 2011, which claims the benefit of German Patent Application No. 10 2010 018 804.2, filed Apr. 29, 2010.

TECHNICAL FIELD

This disclosure relates to the field of water turbines or pump turbines. Such turbines have long been known in a large variety of configurations.

BACKGROUND

In the course of growing scarcity and increasing prices of energy, efforts are also increasingly undertaken to exploit water courses with low heights of fall and/or volume flows. Constructions are also applied in this process which are characterized by an especially simple configuration.

A hydroelectric power plant is known from U.S. Pat. No. 4,755,690 B1, comprising a dam which extends transversely to the direction of flow. Numerous power units are provided which respectively comprise a machine set with a turbine and a generator which have a common shaft. The individual machine sets are arranged in lines adjacent to one another and on top of one another and can be lowered to their working position by means of lifting devices. Only simple and sturdy constructions of the aforementioned machine sets can be considered in courses of rivers with low quantities of water and low flow velocities or low heights of fall. Seasonal differences in water quantities need to be taken into account in such courses of river as the differences between high water and low water can be very large. Rocks, driftwood or other bodies may be entrained during rushing flow as well as at low water. Such materials may cause damage to the machine set and blockage of the flow conduit of the turbine.

The invention is based on the object of providing a hydroelectric power plant which In one aspect, a miniature hydroelectric power plant of sturdy and simple configuration is provided that is especially suitable for the aforementioned conditions.

In another aspect, a turbine of the power plant includes a plurality of turbine blades which are arranged in the manner of marine screw propellers. A blade wheel includes a ring which encloses the rotational axis of the blade wheel and which carries the turbine blades on its inner circumference. The blade wheel is free from a shall or hub such that the blades are only fixed to the aforementioned ring. They protrude generally radially from the ring towards the rotational axis of the blade wheel. They are not fixed in any manner at their free ends. Instead, a passage remains between the free ends of the turbine blades through which any floating debris such as rocks, driftwood and the like is allowed to pass.

The stator of the generator encloses the ring and may be used by the same as a supporting bearing.

The power unit consisting of turbine and generator may be used in a river power plant, but also at locations where a flow occurs such as the coastal regions of bodies of water such as oceans.

The power plant may be used in a dam which is installed in the course of a river as a flow obstruction and is generally used for river training in order to decrease high flow velocities for example.

BRIEF DESCRIPTION OF THE DRAWINGS

The invention will be explained in closer detail by reference to the enclosed drawings, which show in detail;

FIG. 3 shows a power unit with a cooling device; FIG. 3.1 shows an open cooling system; FIG. 3.2 shows a closed cooling system;

DETAILED DESCRIPTION

Figure 1:
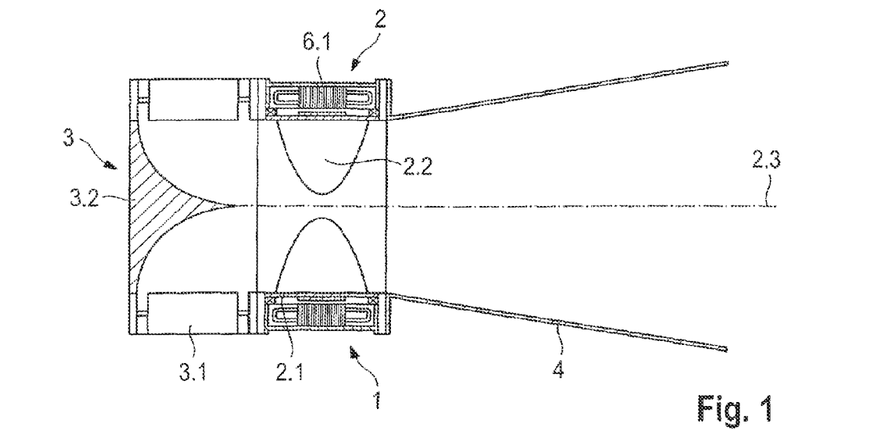
FIG. 1 shows the principal arrangement of a power unit with an inlet and a suction tube.

FIG. 1 schematically shows a power unit 1 as a relevant component of a hydroelectric power plant. The power unit 1 comprises a turbine with a blade wheel ring 2.1. The turbine is enclosed by an electric generator 6. A distributor 3 is provided upstream of the turbine 2. It comprises fixed or adjustable guide blades 3.1. Water flows in the radial direction towards the distributor 3. It will be deflected in the axial direction. A suction pipe 4 arranged downstream of the power unit.

The turbine 2 includes turbine blades 2.2 that are rigidly connected with the blade wheel ring 2.1. Their radially inner ends do not reach up or axially extend to the rotational axis 2.3 of the turbine 2, so that an opening remains between the ends. Floating debris entrained by the water is allowed to pass through this opening.

Figure 2:
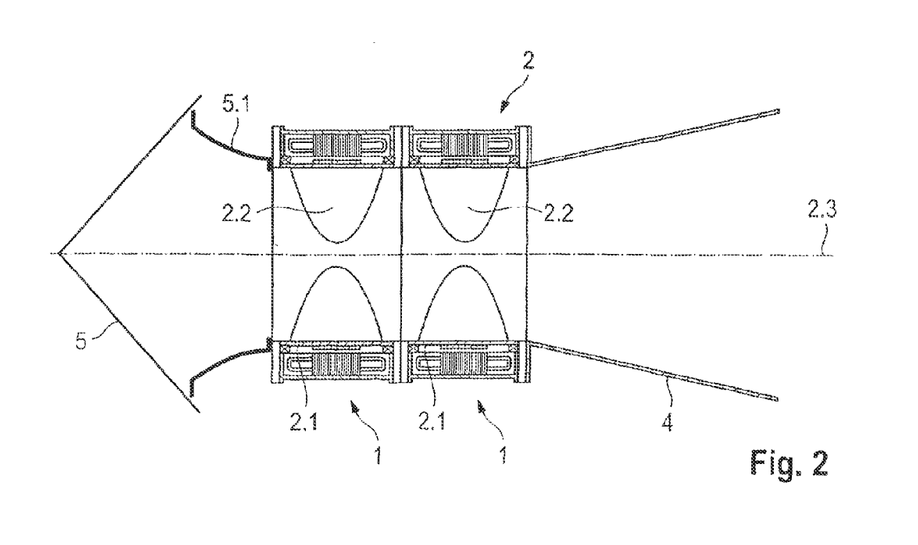
FIG. 2 shows an apparatus similar to FIG. 1, but with two power units switched in succession.

The embodiment shown in FIG. 2 is arranged similar to the one according to FIG. 1. However, two power units 1 are provided in this case.

The distributor 3 forms a constricting flow channel. The flow extends without any deflection in the direction of the rotational axis 2.3.

A bar grating 5 may be provided upstream of the distributor 3. It has the general shape of a cone, which appears in the illustration as an arrow. The bar grating 5 may also have other shapes such as a-spherical cap or be generally planar.

Figures 3, 31, 32:
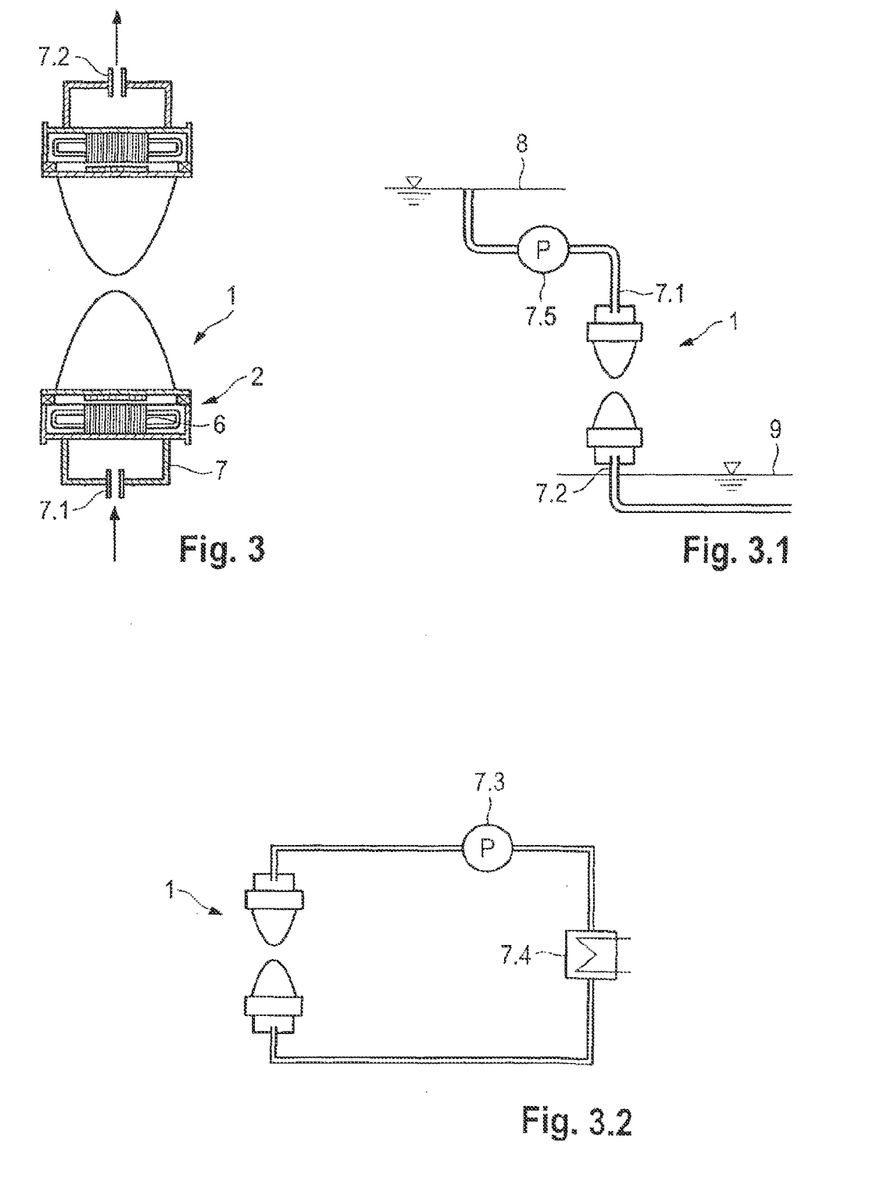

FIG. 3 illustrates in a highly schematic manner a further power unit 1 with a turbine 2 according to the configuration as already described above. The turbine is therefore hubless. The turbine 2 is enclosed by an annular cooling chamber 7. It comprises an inlet 7.1 and an outlet 7.2 for the cooling medium. The cooling system is provided with the task of removing the heat occurring in the stator device. FIG. 3.1 illustrates a passage or flow system in which cooling medium flows in from the upstream water 8 of the ring chamber through the inlet 7.1 and leaves the same through the outlet 7.2 again and flows to the downstream water 9. A pump 7.5 can be provided in this case. FIG. 3.2 shows a closed system with a pump 7.3 and a cooling device 7.4. Closed systems are preferable when the water shows a high degree of pollution.

Figure 4:
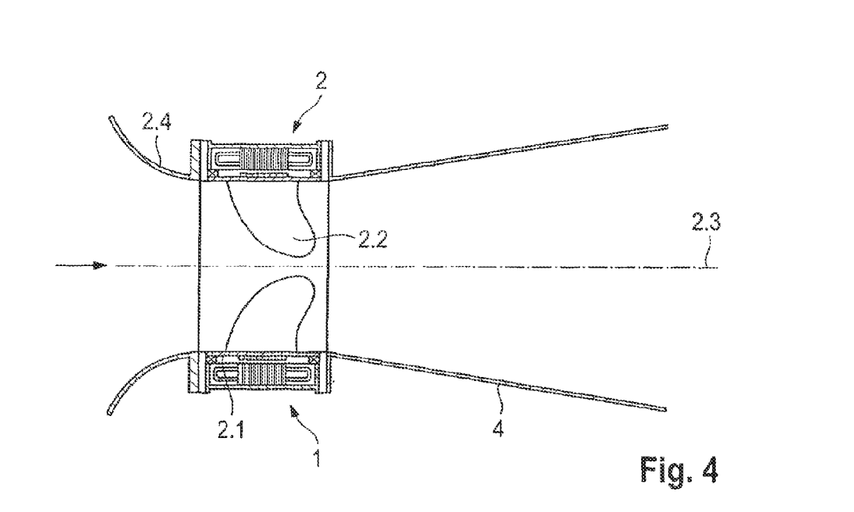
FIG. 4 shows a power unit with an alternate configuration of the turbine blades.
Figure 5:
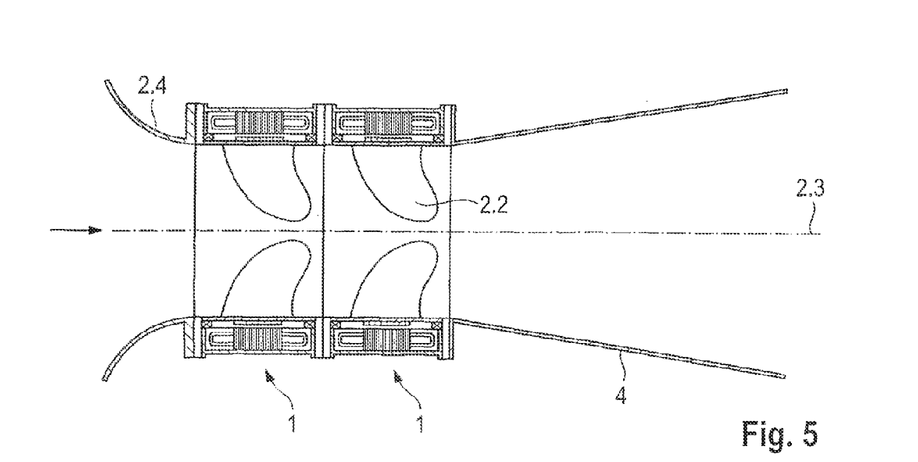
FIG. 5 shows an apparatus similar to that according to FIG. 4, but in a tandem arrangement of two power units.

The power unit 1 as shown in FIG. 4 comprises a turbine 2 with turbine blades 2.2 of a special or alternate configuration. The turbine blades 2.2 are curved in the downstream direction. The free ends of the turbine blades 2.2 therefore face in the direction towards the downstream water. This promotes the discharge of floating debris which is entrained by the water and prevents the adherence of foreign particles to the turbine blades 2.2. FIG. 5 shows a similar configuration, but with two power units 1.

Figure 6:
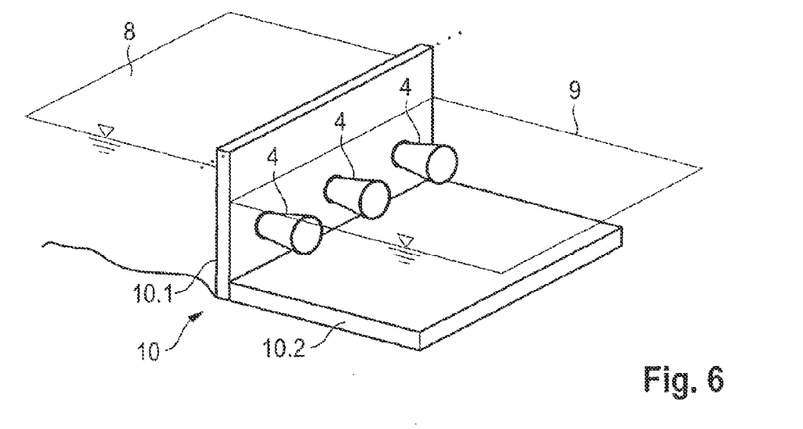
FIG. 6 shows a schematic overall view of a retaining dam and power units.

FIG. 6 illustrates a retaining dam 10. It has an L-shaped contour as seen in a vertical sectional view placed in the direction of flow, comprising a vertical limb 10.1 and a horizontal wall 10.2. The vertical wall 10.1 carries three power units with distributor and suction tubes. Only the suction tubes 4 are shown in the drawing. Only the upstream water 8 is shown.

Figure 7:
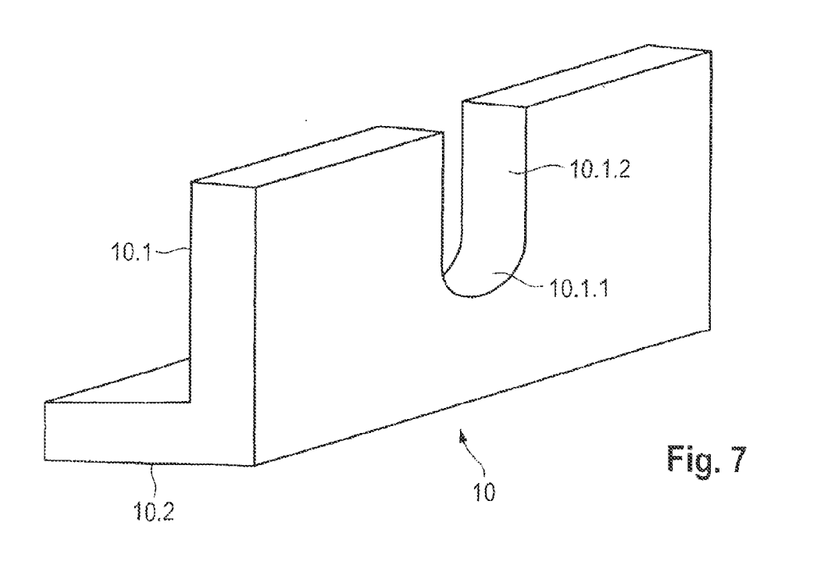
FIG. 7 shows a retaining dam in a perspective view.

The retaining dam 10 shown in FIG. 7 comprises a vertical wall 10.1 and a base or horizontal wall 10.2. The retaining dam is located in a river. The base 10.2 is placed on the riverbed and rigidly connected with the vertical wall 10.1. The base 10.2 is situated on the downstream side. A recess with a circular bottom part or section 10.1.1 and a rectangular upper part or section 10.1.2 is disposed in the vertical wall 10.1. A machine part in accordance with the invention can be inserted in this case from above and can also be extracted upwardly again.

Figure 8:
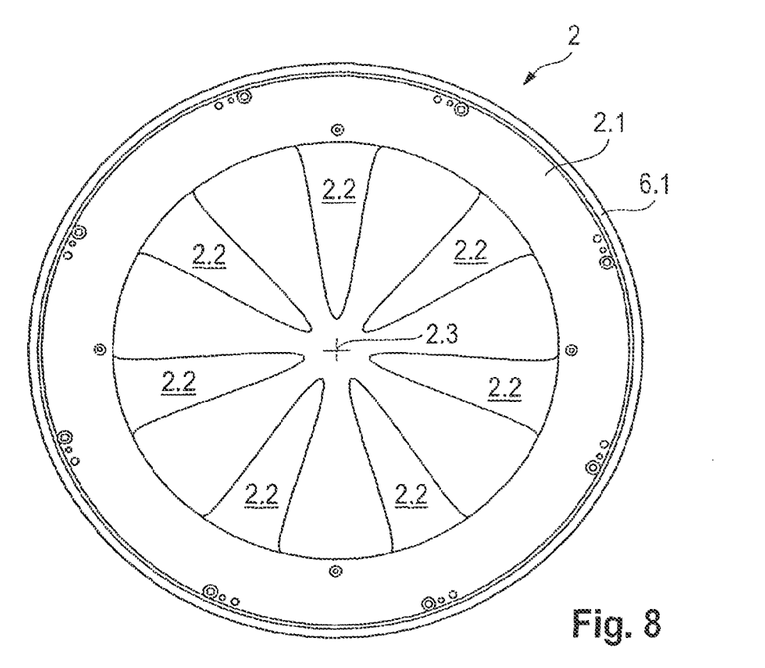
FIG. 8 shows an axially end view of a turbine with parts of a generator.

FIG. 8 shows the turbine 2. It comprises a rotational axis 2.3 which is simultaneously the rotational axis of the generator 6. The turbine 2 comprises a plurality of blades 2.2 and further a blade wheel ring 2.1. The blades 2.2 are rigidly connected with the blade wheel ring 2.1. They are fixed to the inner circumference of the blade wheel ring 2.1. The radially inner ends of the blades 2.2 on the other hand are completely free because the turbine 2 is free from a shall or hub. A relatively large cavity is disposed radially within the blades 2.2. Floating debris or floating bodies can pass through this cavity during operation of the machine set. The turbine 2 is enclosed by a generator 6. Axial bearings 13, 13 and radial bearings 14, 14 are disposed between the stator ring 6.1 and the blade wheel ring 2.1.

Figure 9:
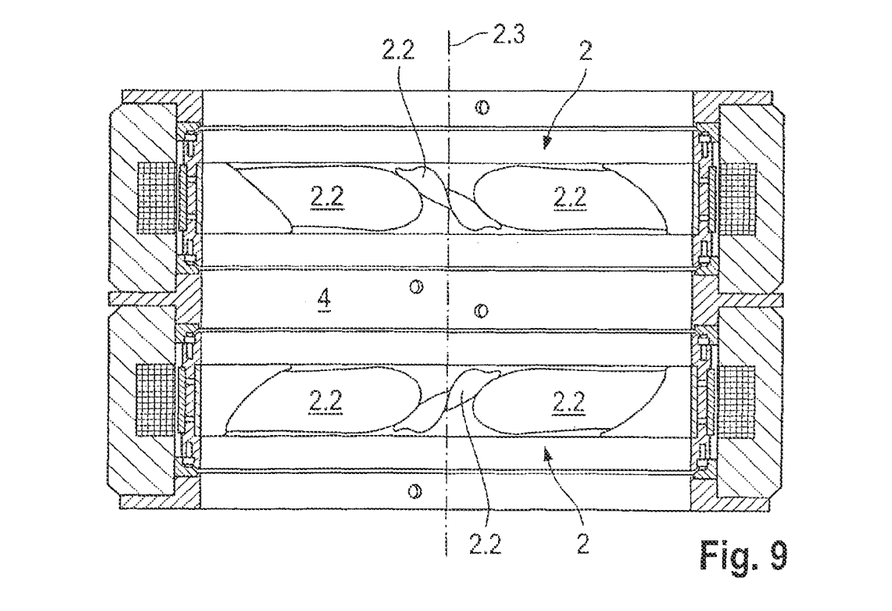
FIG. 9 shows an axially sectional view of two power units switched axially in series.

FIG. 9 shows another embodiment. Two machine sets which respectively consist of a turbine 2 and the generator 6 are arranged axially one behind the other. This duplex arrangement leads to the higher energy yield in operation. The efficiency is therefore higher than in a single machine set with only one single unit consisting of a turbine 2 and a generator 6. Moreover, the duplex configuration is more flexible in operation than a single configuration. It is not necessary to operate both units simultaneously. Instead, either or both units can be switched off or switched on. The blades 2.2 can be recognized again in the two turbines 2, which are respectively carried by the blade wheel ring 2.1. The blade wheel ring 2.1 is mounted in the stator ring 6.1. A spacer flange is provided between the two units. A housing is associated with the two machine sets.

The axial distance between the two turbines should be as small as possible. In one example the axial distance may be between 1 and 3 mm. In another example, the axial distance may be less than approximately 1 mm. The two generators are arranged in such a way that they revolve in opposite directions.

Figure 10:
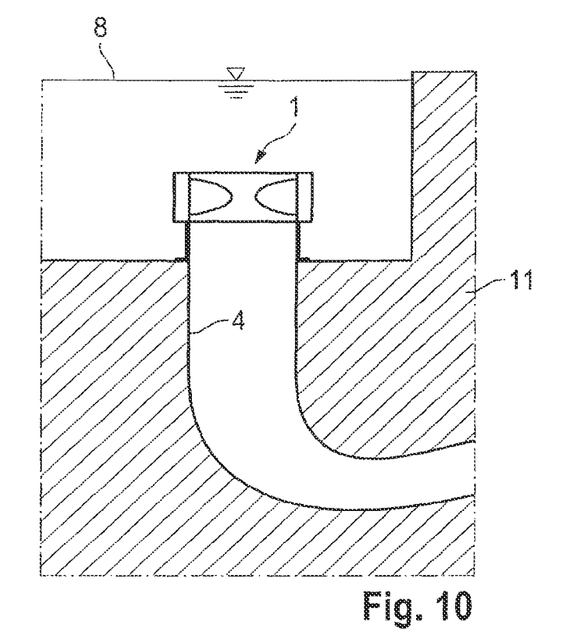
FIG. 10 shows a schematic elevated view of a power plant in a vertical plane of intersection placed in the direction of flow.

In the embodiment according to FIG. 10, one power unit 1 will receive a vertical inflow from the upstream water 8. A suction tube 4 is connected and may be, formed of a structure 11 made of concrete.

Figure 11:
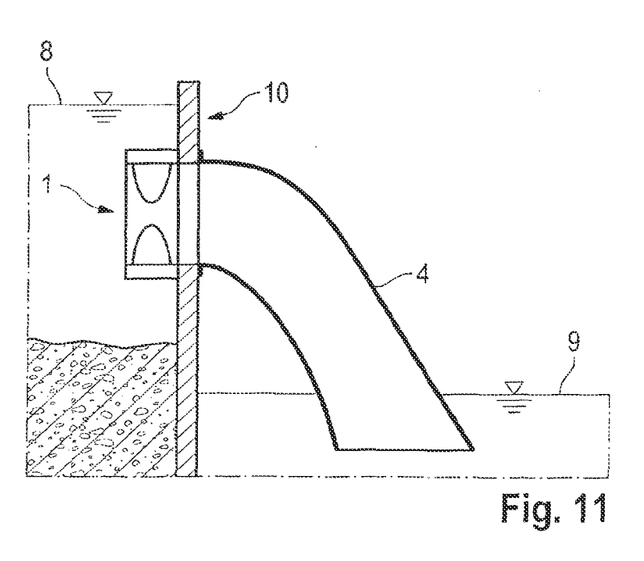
FIG. 11 shows a power plant in a view similar to the one according to FIG. 10.

In the embodiment according, to FIG. 11, the upstream water 8 flows horizontally against the power unit 1. The power unit 1 is attached to the retaining dam 10. The suction tube 4 opens beneath the downstream water 9.

Figure 12:
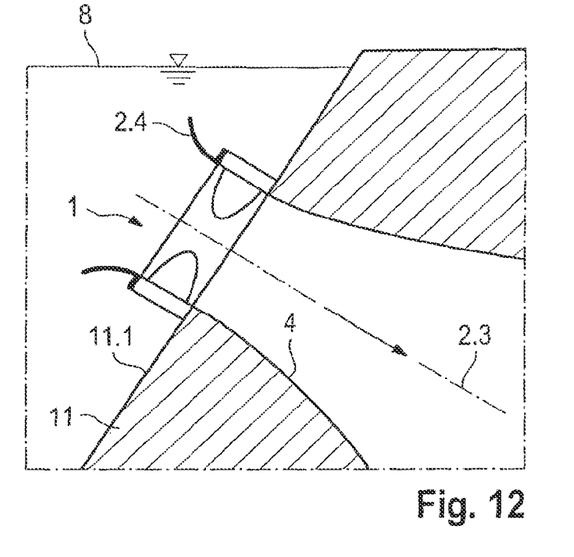
FIG. 12 shows a further power plant in a view similar to the one according to FIG. 10.

In the embodiment according to FIG. 12, a structure 11 made of concrete is shown. It comprises an area 11.1 which is inclined against or relative to the vertical. The structure 11 also forms the suction tube 4.

Figure 13:
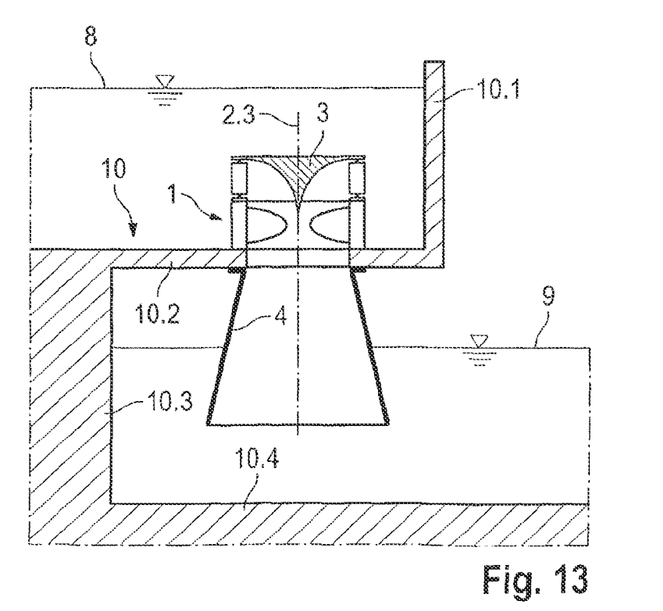
FIG. 13 shows a further power plant in a view similar to the one according to FIG. 10.

In the embodiment according to FIG. 13, the upstream water 8 flows vertically against the power unit 1. The retaining dam 10 comprises a vertical wall 10.1. The horizontal wall 10.2 is disposed upstream of the vertical wall 10.1 and, therefore beneath the upstream water 8. A further vertical wall 10.3 is attached to the horizontal wall 10.2, followed by a further horizontal wall 10.4. The suction tube 4 is disposed in the space enclosed by the walls 10.2, 10.3 and 10.4 and immerses in or opens to the downstream water 9.

Figure 14:
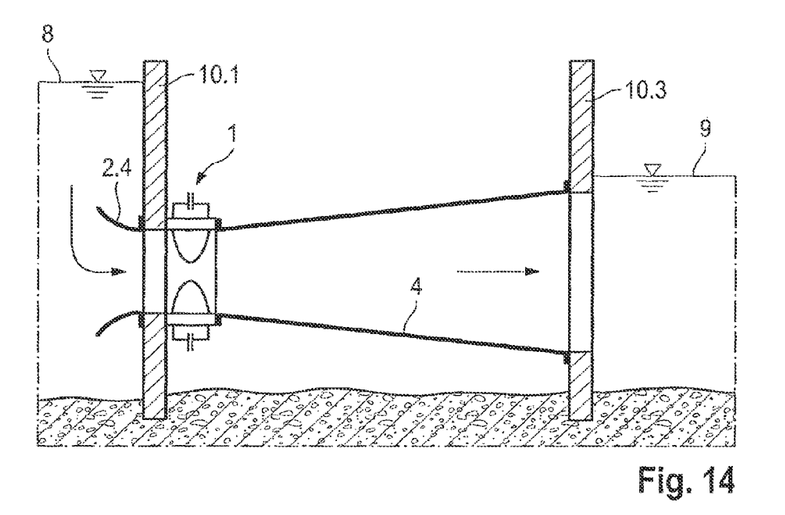
FIG. 14 shows a further power plant in a view similar to the one according to FIG. 10.

In the embodiment according to FIG. 14, two spaced apart vertical walls 10.1, 10.3 are provided. The first vertical wall 10.1 dams up the upstream water 8. The power unit 1 is attached to the first vertical wall 10.1. The downstream end of the suction tube 4 is mounted in the second vertical wall 10.3. Upstream water 8 will therefore be deflected and introduced into the turbine 2 of the power unit 1. It then flows horizontally through the suction tube to the downstream water 9.

Figure 15:
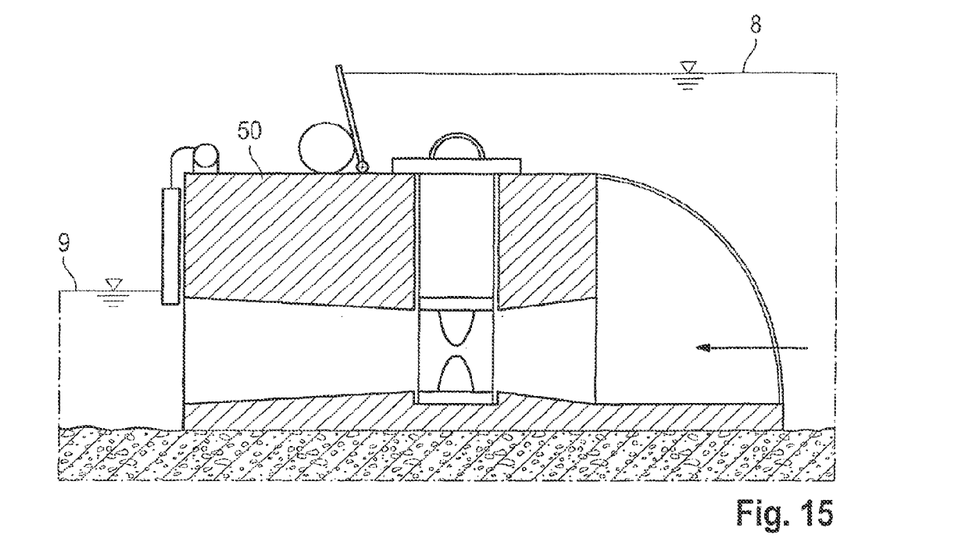
FIG. 15 shows a hydroelectric power plant with a cassette which can be inserted and carries a power unit in a vertical sectional view placed in the direction of flow.
Figure 16:
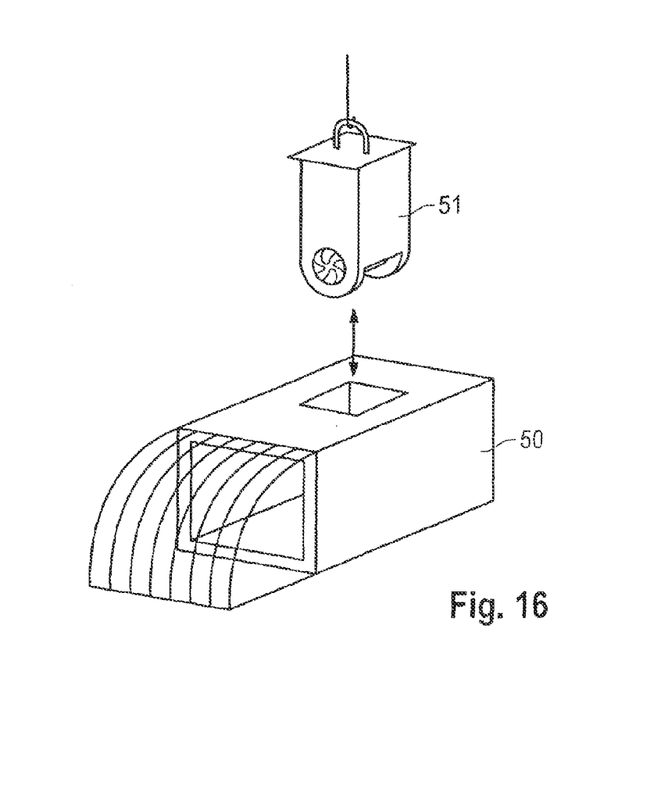
FIG. 16 shows the item of FIG. 15 in a schematic view.

The hydroelectric power plant shown in FIG. 15 in a sectional view is a so-called overflow power plant. Module 50 is arranged as a concrete body for example. The drawing further shows a turbine 2 which is arranged according to the FIGS. 8 and 9, comprising one or two or more blade wheels. Module 50 comprises a vertical shaft (also see FIG. 6). A cassette 51 can be inserted from above into the vertical shaft. The cassette 51 carries the complete power unit 1. A single module can accommodate several such cassettes 51 and therefore also several shafts. A bar grating 5 is provided upstream of the module. The bar grating is approximately provided with the shape of a quadrant in this embodiment. It could also be provided with a different configuration. This embodiment is extremely economical since it is simple in its configuration and easy to mount and maintain.

Figure 17:
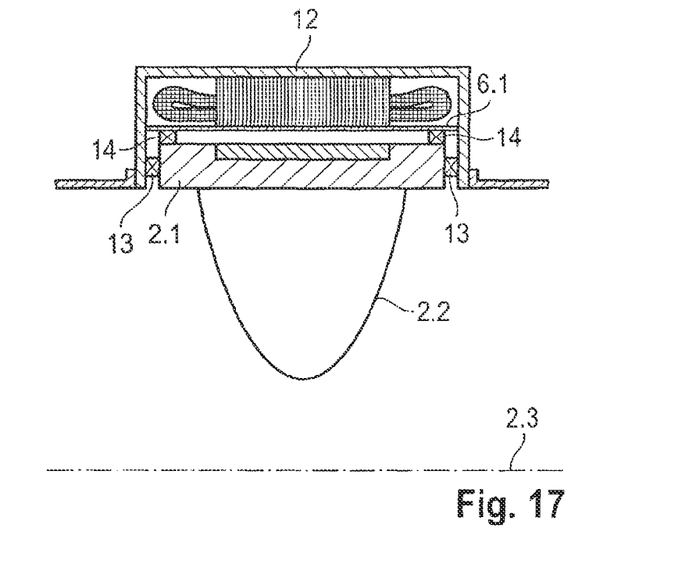
FIG. 17 shows a power unit in an axial sectional view.
Figure 18:
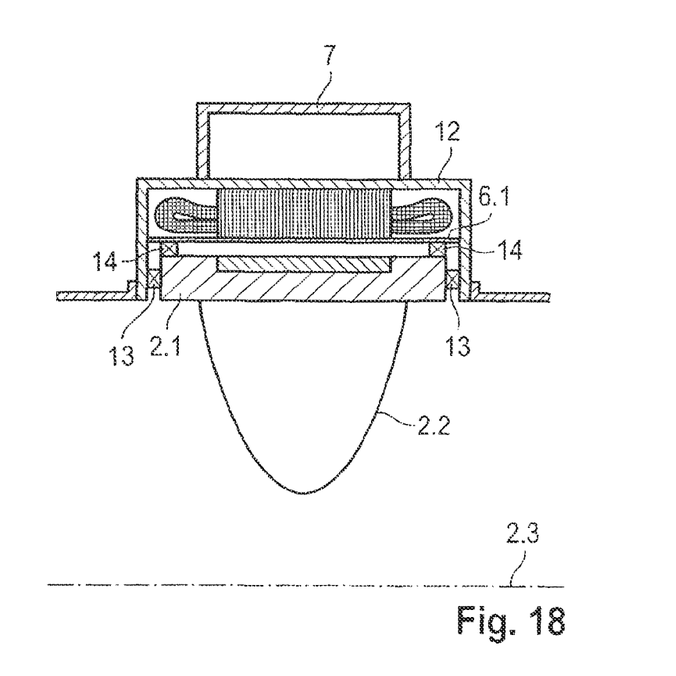
FIG. 18 shows a power unit in an axial sectional view with a cooling device.

FIG. 17 shows additional detail concerning the turbine 2 and generator 6. An axial bearing 13 is disposed between the blade wheel ring 2.1 of the turbine 2 and a housing 12, namely at both axial ends of the blade wheel ring 2.1. Radial bearings 14 are disposed between the blade wheel 6.1 of the generator 6 and the blade wheel ring 2.1. FIG. 18 shows the power unit 1 of FIG. 17 with the cooling chamber 7.

Figure 19:
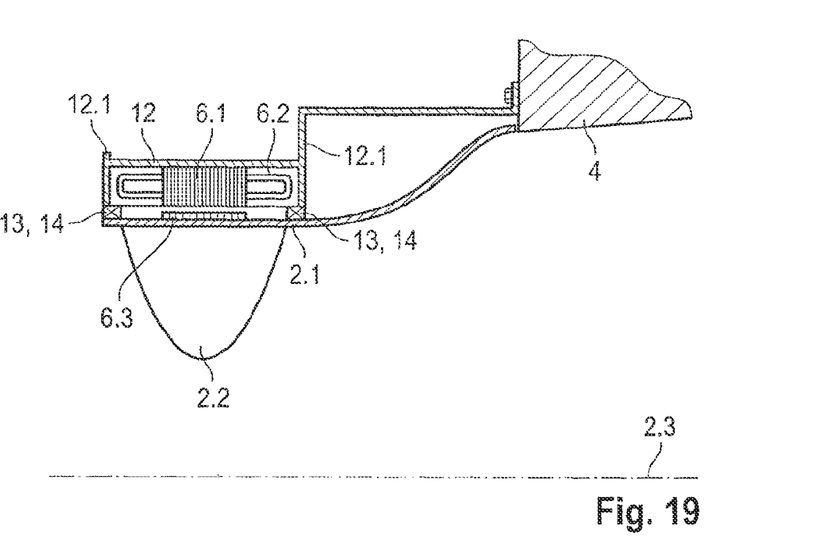
FIG. 19 shows a power plant with a hubless turbine, to which a revolving outlet sleeve is connected.
Figure 20:
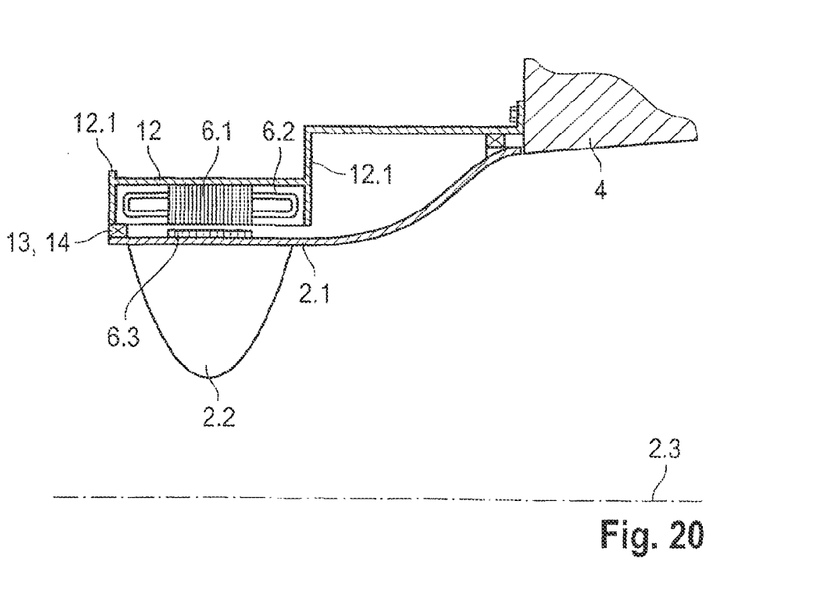
FIG. 20 shows a detail in connection with the item according to FIG. 19.

FIG. 19 shows a power plant and a hubless turbine 2 in a vertical sectional view placed in the direction of flow. An outlet sleeve 2.5 is connected to the blade wheel ring 2.1. The outlet sleeve 2.5 is connected in a torsion-proof manner with the blade wheel ring 2.1, and is optionally also integrally arranged with the blade wheel ring. The outlet sleeve 2.5 has the shape of a trumpet tube. It can also be cylindrical or approximately cylindrical. It offers the following advantage: the sleeve expands like a conventional suction tube, as is illustrated. Since the outlet sleeve 2.5 revolves together with the blade wheel ring 2.1 of the turbine 2, the likelihood of flow separation on the inner walls of the outlet sleeve will be reduced in comparison with a suction tube with fixed walls. This means that the length of the sleeve can be smaller than the length of a conventional suction tube. Considerable construction costs can be saved thereby. The aforementioned outlet sleeve 2.5 can also be used in turbines of other configurations. It therefore need not be connected in a torsion proof manner with the blade wheel of the turbine.

The axial extension of the outlet sleeve 2.5 can also be substantially smaller than shown herein. Even an axial length of 10% of the diameter at the beginning of the outlet sleeve 2.5 provides the aforementioned advantage.

The invention claimed is:

1. A hydroelectric power plant comprising:
a power unit having a turbine and a generator;
a blade wheel of the turbine comprises a blade wheel ring and turbine blades;
the blade wheel ring being enclosed by the generator and operating as a bearing for the generator;
each turbine blade having a radial outer end and radial inner end, the turbine blades being curved in a downstream direction, the radial outer end of each turbine blade being fixed to an inner surface of the blade wheel ring, and the radial inner end of each turbine blade being spaced from radial inner ends of other of the turbine blades to form a central cross-flow opening;
a cassette enclosing the power unit;
a retaining box having an upstream water side and a water flow passage configured to permit water to flow from the upstream water side through the retaining box, the retaining box further including an aperture and a vertical shaft extending between the aperture and the water flow passage, the cassette being positioned in the vertical shaft and extending between the aperture and the water flow passage; and
a distributor disposed upstream of the power unit, the distributor including a radial inlet and an axial outlet.

2. A hydroelectric power plant according to claim 1, wherein the power unit is arranged at a constriction of a flow channel.

3. A hydroelectric power plant according to claim 1, wherein the power unit is enclosed by an annular cooling chamber which includes an inlet and an outlet for a cooling medium.

4. A hydroelectric power plant according to claim 3, wherein the cooling chamber is a component of one of a closed cooling circuit and an open cooling circuit.

5. A hydroelectric power plant according to claim 1, wherein the vertical shaft includes inner sidewalls, the cassette includes outer sidewalls, and the outer sidewalls of the cassette are adjacent the inner sidewalls of the vertical shaft.

6. A hydroelectric power plant according to claim 1, wherein the cassette has a generally rectangular cross-section and the vertical shaft in which the cassette is positioned has a complimentary shaped cross-section.

7. A hydroelectric power plant according to claim 1, wherein the retaining box has an upwardly facing surface and the vertical shaft extends through the upwardly facing surface and intersects with the water flow passage.

8. A hydroelectric power plant according to claim 7, wherein the cassette extends from the upwardly facing surface to the water flow passage.

9. A hydroelectric power plant according to claim 7, wherein the cassette includes a flange positioned generally adjacent the upwardly facing surface.

10. A hydroelectric power plant according to claim 1, wherein the retaining box has an upper surface and the vertical shaft extends from the upper surface to the water flow passage and the cassette extends from the upper surface to the water flow passage.

11. A hydroelectric power plant according to claim 1, wherein the cassette and the vertical shaft are similar in size and shape.

12. A hydroelectric power plant according to claim 1, wherein the retaining box is formed of concrete.

13. A hydroelectric power plant comprising:
a power unit having a turbine and a generator;
a blade wheel of the turbine comprises a blade wheel ring and turbine blades;
the blade wheel ring being enclosed by the generator and operating as a bearing for the generator;
each turbine blade having a radial outer end and radial inner end, the turbine blades being curved in a downstream direction, the radial outer end of each turbine blade being fixed to an inner surface of the blade wheel ring, and the radial inner end of each turbine blade being spaced from radial inner ends of other of the turbine blades to form a central cross-flow opening;
a cassette enclosing the power unit;
a cassette retaining module having an upstream water side and having a water flow passage configured to permit water to flow from the upstream water side through the cassette retaining module, the cassette retaining module further including an upwardly facing surface and a vertical shaft extending from the upwardly facing surface and intersecting with the water flow passage, the cassette being positioned in the vertical shaft and extending between the upwardly facing surface and the water flow passage; and
a distributor disposed upstream of the power unit, the distributor including a radial inlet and an axial outlet.

14. A hydroelectric power plant according to claim 13, wherein the power unit is arranged at a constriction of a flow channel.

15. A hydroelectric power plant according to claim 13, wherein the vertical shaft includes inner sidewalls, the cassette includes outer sidewalls, and the outer sidewalls of the cassette are adjacent the inner sidewalls of the vertical shaft.

16. A hydroelectric power plant according to claim 13, wherein the cassette has a generally rectangular cross-section and the vertical shaft in which the cassette is positioned has a complimentary shaped cross-section.

17. A hydroelectric power plant according to claim 13, wherein the cassette includes a flange positioned generally adjacent the upwardly facing surface.

18. A hydroelectric power plant according to claim 13, wherein the cassette retaining module has an upper surface and the vertical shaft extends from the upper surface to the water flow passage and the cassette extends from the upper surface to the water flow passage.

19. A hydroelectric power plant according to claim 13, wherein the cassette and the vertical shaft are similar in size and shape.

20. A hydroelectric power plant according to claim 13, wherein the cassette retaining module is formed of concrete.

* * * * *